(12) United States Patent
Georgiev

(10) Patent No.: US 9,196,226 B2
(45) Date of Patent: Nov. 24, 2015

(54) COMPUTER-IMPLEMENTED METHODS AND SYSTEMS FOR LAYING OUT ELECTRONIC CONTENT ELEMENTS

(75) Inventor: Evtim Ivanov Georgiev, Mountain View, CA (US)

(73) Assignee: Adobe Systems Incorporated, San Jose, CA (US)

(*) Notice: Subject to any disclaimer, the term of this patent is extended or adjusted under 35 U.S.C. 154(b) by 684 days.

(21) Appl. No.: 13/150,618

(22) Filed: Jun. 1, 2011

(65) Prior Publication Data

US 2013/0321440 A1 Dec. 5, 2013

(51) Int. Cl.
*G09G 5/26* (2006.01)
*G06F 3/147* (2006.01)
*G06F 17/21* (2006.01)

(52) U.S. Cl.
CPC *G09G 5/26* (2013.01); *G06F 3/147* (2013.01); *G06F 17/211* (2013.01); *G06F 17/218* (2013.01); *G09G 2340/0407* (2013.01); *G09G 2380/04* (2013.01)

(58) Field of Classification Search
CPC ....... A61L 2/26; A61L 12/086; A61L 12/128; A61L 2/24; G06F 21/60; G06F 21/10; G06F 21/31; G06F 21/00; G06F 3/04883; G06F 17/30017; G06F 21/105; G06F 3/0481; G06F 19/3481; G06F 3/0484
USPC ......................................................... 345/660
See application file for complete search history.

(56) References Cited

U.S. PATENT DOCUMENTS

| | | | |
|---|---|---|---|
| 6,414,698 B1* | 7/2002 | Lovell et al. | 715/800 |
| 7,216,294 B2 | 5/2007 | Gibbs et al. | |
| 7,765,470 B2 | 7/2010 | Epstein | |
| 2005/0071781 A1 | 3/2005 | Atkins | |
| 2006/0259860 A1* | 11/2006 | Kobashi | 715/521 |
| 2007/0136201 A1* | 6/2007 | Sah et al. | 705/51 |
| 2011/0320938 A1* | 12/2011 | Schorsch | 715/269 |

OTHER PUBLICATIONS

"First and Parallel Webpage Layout," Leo A. Meyerovich et al., University of California, Berkeley.

* cited by examiner

*Primary Examiner* — Devona Faulk
*Assistant Examiner* — F. M. Hossain
(74) *Attorney, Agent, or Firm* — Kilpatrick Townsend & Stockton LLP

(57) ABSTRACT

One exemplary embodiment involves performing a function on a container to determine a value for a container size attribute, wherein a contained element is contained by the container. Performing the function on the container involves determining whether the container constrains a contained element size attribute of the contained element. Performing the function on the container further involves performing the function on the contained element to determine a value for the contained element size attribute. If the container constrains the contained element size attribute, the function is passed information identifying how the container constrains the contained element size attribute. If the container does not constrain the contained element size attribute, the function is passed information identifying that the container does not constrain the contained element size attribute. Performing the function on the container further involves determining the value of the size attribute of the container.

17 Claims, 5 Drawing Sheets

COMPUTER-IMPLEMENTED METHODS AND SYSTEMS FOR LAYING OUT ELECTRONIC CONTENT ELEMENTS

FIELD

This disclosure relates generally to computer software and more particularly relates to the creation, modification, and use of electronic content.

BACKGROUND

Electronic content can include various types of graphical elements and employ various techniques in positioning those elements during execution or other use of the electronic content. Electronic content may include attributes that define or specify element size, position, and other constraints that provide various limitations on the positions and sizes of the elements. An element's position and/or size may be defined with attributes such as left, right, top, bottom, horizontal center, vertical center, baseline position, X/Y, width, height, minimum and maximum width and height, gap or space between elements, vertical alignment, horizontal alignment, width as a percentage, height as a percentage, etc. Such attributes may provide size and/or shape specification relative to the entire electronic content display area or to a container representing that entire area, or may be defined with respect to some other reference. For example, elements may be organized in a hierarchy such that one element, i.e., a parent or container element, can contain one or more other elements, i.e., its child elements. The positions and sizes of child elements can be defined relative to the container that contains them. Changes to the position and/or size of the parent can change the positions and/or size of the child elements and vise-versa. Thus, for example, when a container is resized, the child elements may change accordingly.

Constraints are thus used to constrain an element's position or size, for example, relative to other elements or to a container that contains the element. For example, one or more constraints may define the distance between a child element and the edges of the container that contains it. As another example, one or more constraints may define specified numerical values for the width and height of the element. As another example, one or more constraints may define minimums and maximums for width and height. As another example, one or more constraints may specify an amount of padding required on an element's left, right, top, and/or bottom relative to the content sides or sides of an element containing the element. As another example, one or more constraints may require input to define the text of an element.

Some types of constraints are explicitly specified by a developer during development of the electronic content. For example, a developer may specify size constraints requiring an element to be 100 pixels wide and 10 pixels tall. Other constraints depend on runtime data and thus may be considered implicitly defined. For example, a box element's size attributes may be constrained such that the box will be sized (and possibly resized during runtime) to be just big enough to fit runtime-determined text that is displayed within it.

Conventional layout features have various disadvantages in particular with respect laying out elements that have interdependent dimensions. For example, it may be desirable to have layout functionality within a piece of electronic content control the resizing of a box element that has within it a long string of text such that if the box is made shorter its height increases to accommodate the text reflowing. To handle such reflow situations developers have written specific code to calculate and set positions and sizes. Even when addressed by custom developer code, the handling of reflow situations and other layout functionality has been hindered by inefficiencies. Conventional layout techniques have further been inefficient in performing layout functions on elements the layout of which is considered "invalid," i.e., an element's layout is considered invalid initially and after a change that requires checking whether the element needs to be laid out again. For example, multiple layout passes have been required to validate such invalidated elements because of, among other things, elements having dimensionally interdependent constraints. In addition, conventional layout techniques have included layout functionality that has involved performing unnecessary measurement calculations and/or hinders measurement optimizations by performing measurement and layout functions in separate phases.

SUMMARY

One exemplary embodiment involves performing a function on a container to determine a value for a container size attribute, wherein the container is used in electronic content and a contained element is contained by the container. Performing the function on the container involves determining whether the container constrains a contained element size attribute of the contained element. Performing the function on the container further involves performing the function on the contained element to determine a value for the contained element size attribute. If the container constrains the contained element size attribute, the function is passed information identifying how the container constrains the contained element size attribute. If the container does not constrain the contained element size attribute, the function is passed information identifying that the container does not constrain the contained element size attribute. Performing the function on the container further involves determining the value of the size attribute of the container.

Another exemplary embodiment involves determining that a container has a width limitation that constrains a width of an element contained within the container, wherein the container is used in electronic content. The exemplary embodiment further involves performing a first function to determine a value for the width of the element, wherein a parameter of the first function identifies the width limitation that constrains the contained element width. The exemplary embodiment further involves performing a second function to determine a value for the height of the element, wherein the value for the height of the element is determined based on the value determined for the width of the element. And, the exemplary embodiment further involves determining a value for the height of the container based on the value determined for the height of the element.

Another exemplary embodiment involves determining, via an invalidate function, whether to invalidate a layout of an element, wherein invalidation of the layout indicates a requirement to lay out the element. Determining whether to invalidate the layout of the element involves determining whether a container containing the element has a measured size that depends on a measured size of the element. If the container measured size depends on the element measured size, the embodiment involves determining, via the invalidate function, whether to invalidate a layout of the container. Determining whether to invalidate the layout of the element also involves determining whether the element is fully constrained to the container. And, determining whether to invalidate the layout of the element also involves invalidating the element if the container is invalidated or if the element is not fully constrained to the container.

These illustrative features are mentioned not to limit or define the disclosure, but to provide examples to aid understanding thereof. Additional embodiments are discussed in the Detailed Description, and further description is provided there. Advantages offered by one or more of the various embodiments may be further understood by examining this specification or by practicing one or more embodiments presented.

BRIEF DESCRIPTION OF THE FIGURES

These and other features, aspects, and advantages of the present disclosure are better understood when the following Detailed Description is read with reference to the accompanying drawings, where.

DETAILED DESCRIPTION

Figure 1:
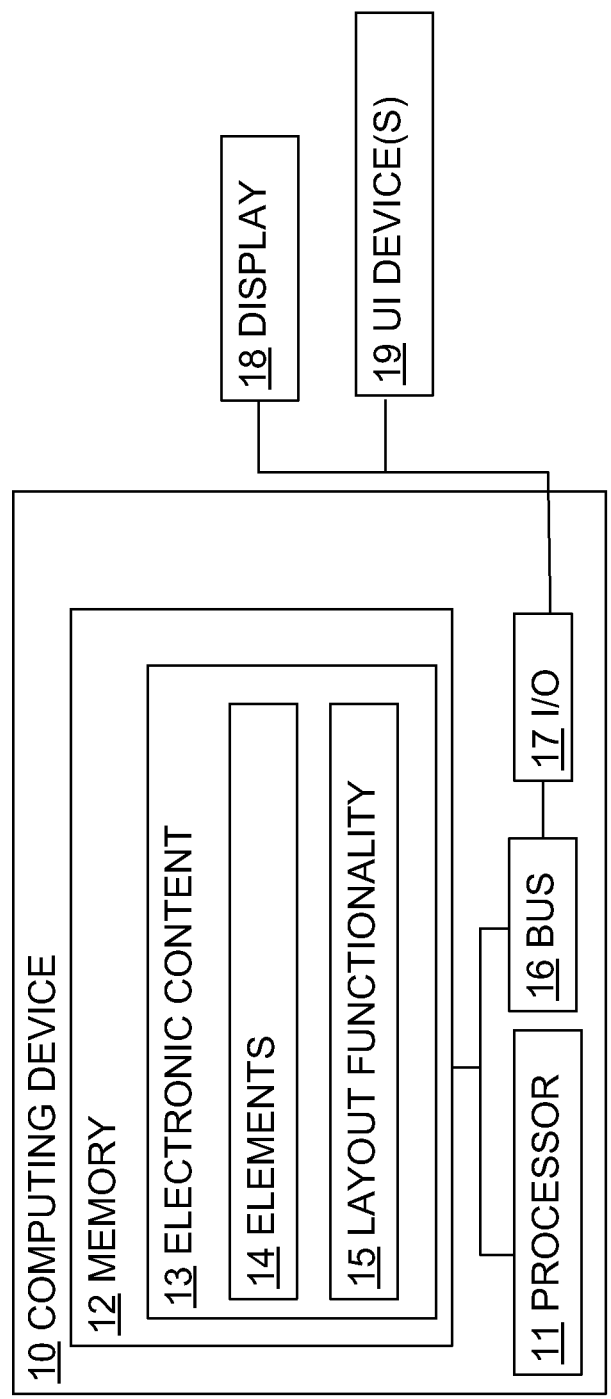
FIG. 1 is a block diagram depicting exemplary computing devices in an exemplary computing environment for implementing certain embodiments.

Computer-implemented systems and methods for laying out electronic content elements are disclosed. Layout functionality used as part of or otherwise used in the use of a piece of electronic content is provided to control the resizing/repositioning, i.e., the layout, of the electronic content's elements. Such layout functionality may use functions with parameters that provide more information than those used by conventional layout techniques. For example, upon a change during use of electronic content possibly requiring re-laying out one or more elements, one or more functions can be called to determine whether any elements need to be resized/repositioned and to cause any necessary re-laying out of elements to occur. Such functions may address the circumstances in which elements are constrained to one another.

Various improved features are further provided for laying out elements of a piece of electronic content that comprises one or more outer containers that comprises one or more elements and/or inner containers. The inner containers may each themselves contain one or more other elements and/or inner containers and so on, such that the containers and elements can be stored in a data structure that corresponds to a hierarchy or tree structure in which each lower layer within the tree comprising elements or containers that are contained within a container of a higher layer of the tree. To layout elements of a piece of electronic content comprising such a tree or hierarchy of containers and elements, a function may be called for a first element that may itself include function calls (possibly recursive function calls) to determine constraints imposed by and on other elements. Such functions may use parameters that provide more information than those used by conventional layout techniques.

The following example is provided as an illustration of providing more information to a layout function. In the example, a piece of electronic content comprises a label L inside a container C. The label L is constrained to have a width that is 100% of the width of container C, but does not have any constraints on its height such that it can take as much space as it needs. In this example, the container is 100 pixels wide. One or more functions can be called to determine the width and height of the label. For example, in a top-down layout pass, a function can be called to determine the layout of the container by using a measure height function and a measure width function. The measure width function may identify that the width is fixed at 100 pixels. The measure height function, however, may determined that the height of the label is dependent upon its children and recursively calls the measure height function on the child, which in this example, is the label. In using such a function to measure the height of the child, unlike in the contemporary systems, non-numerical information can be passed as one or more parameters. The parameters may identify a fixed width constraint of 100 based on the container's fixed width and for height provide a parameter that indicates that height information is not available, i.e., that there is no constraint coming from the container for the height. The function can then determine how tall the label needs to be based on the information that width is 100 pixels and height is not constrained. The function can determine that a width of 100 pixels will require the text of the label to reflow onto 3 lines and return a height of 36 pixels, i.e., 12 pixels for each line in this example. This example illustrates how providing certain types of additional information, in this example the information that the parent does not constrain height, allows the layout to be determined more effectively and efficiently.

In one embodiment layout functionality is used to layout or adjust the layout of a tree of elements by computing element size and/or position, for example, by computing simple rectangular layout bounds for each element. Containers with child elements, i.e., non-terminal layout elements may have a layout object that defines how their children's layout bounds are to be computed. Pre-defined layout objects for common arrangements of layout element children and custom layout objects can be defined. Some layout objects are constrained by, i.e., depend on, properties of their children.

When any aspect of an element changes that might require re-calculation of its layout, an "invalidate" function may be called so that the layout functionality knows that the element is currently invalid. The layout functionally may track invalid elements in a data structure. In a layout pass, the layout functionality may iterate through the data structure, remove elements from the structure as the elements are validated, and update the layout as is appropriate. During an initial layout, all elements are considered to be invalid and a layout pass may iterate through every element of the electronic content.

In one embodiment, layout functionality validates elements in a single layout pass. Using non-numerical and other types of information in layout function parameters can allow validation of layout elements in a single pass. In addition, the laying out of elements can be made more efficient by passing more information top down during a layout pass. Using such techniques may be particularly beneficial with respect to providing for the layout of elements with interdependent dimensions, e.g., in which element height depends on width or vice versa, such as may exist in the case of reflowing text within a box element the size of which depends upon the text.

Additional efficiencies can be achieved by making measurements only when necessary, for example, a part of the data structure, and by providing one or more facilities to lay out a sub-tree of the data structure given only partial information. One embodiment reduces or minimizes unnecessary measurement calculations by determining whether or not re-measurement is required by checking whether the child node is going to be changeable without affecting the parent and whether the parent node is such that it does not need to be re-measured even if the child has changed. If a child's measured size does not affect its parent's measured size, then whenever the child size is invalidated the parent size does not need to be invalidated. Similarly, where the layout functionality can identify exactly what the parent size is, measurement of children may be unnecessary.

These illustrative examples are given to introduce the reader to the general subject matter discussed here and are not intended to limit the scope of the disclosed concepts. The following sections describe various additional embodiments and examples with reference to the drawings in which like numerals indicate like elements.

Referring now to the drawings, FIG. 1 is a block diagram depicting exemplary computing device in an exemplary computing environment for implementing certain embodiments. Applications and other electronic content execute or are otherwise used on the exemplary computing device 10 and are shown as functional components or modules. As is known to one of skill in the art, such applications and content may be resident in any suitable computer-readable medium and execute on any suitable processor. For example, as shown the device 10 comprises a computer-readable medium such as a random access memory (RAM) 12 coupled to a processor 11 that executes computer-executable program instructions and/or accesses information stored in memory 12. Such a processor 11 may comprise a microprocessor, an ASIC, a state machine, or other processor, and can be any of a number of computer processors. Such a processor can comprise, or may be in communication with a computer-readable medium which stores instructions that, when executed by the processor, cause the processor to perform the steps described herein.

A computer-readable medium may comprise, but is not limited to, an electronic, optical, magnetic, or other storage device capable of providing a processor with computer-readable instructions. Other examples comprise, but are not limited to, a floppy disk, CD-ROM, DVD, magnetic disk, memory chip, ROM, RAM, an ASIC, a configured processor, optical storage, magnetic tape or other magnetic storage, or any other medium from which a computer processor can read instructions. The instructions may comprise processor-specific instructions generated by a compiler and/or an interpreter from code written in any suitable computer-programming language, including, for example, C, C++, C#, Visual Basic, Java, Python, Perl, JavaScript, and ActionScript.

The client device 10 may also comprise a number of external or internal devices such as a mouse, a CD-ROM, DVD, a keyboard, a display, audio speakers, one or more microphones, or any other input or output devices. For example, device 10 is shown with a display 18 and various user interface devices 19. A bus, such as bus 16, is included in the device 10. Device 10 could be a personal computing device, a mobile device, or any other type of electronic devices appropriate for providing one or more of the features described herein.

FIG. 1 illustrates an exemplary device 10 that comprises, in memory 12, electronic content that comprises elements 14 and layout functionality 15.

As used herein, the terms "element" and "layout element" refer to any part of an application or other electronic content's graphical user interface (GUI) or other graphical display that has size and position on screen. Elements can have other child elements. A tree of layout elements may be used to represent the GUI or graphics of electronic content. Exemplary elements include, but are not limited to, images, text, buttons, controls, graphic primitives, and containers. Developer specified constraints are referred to as "explicit."

As used herein, the terms "container," "layout container," "parent," and "parent element" refer to any element that has one or more child elements (i.e., contained elements) the position of which is constrained or otherwise linked to the container. In a tree of elements used to represent the GUI or graphics of electronic content, non-terminal elements are containers. In one embodiment, each container has a layout object.

As used herein, the term "layout object" refers to pre-defined logic for the arrangement of the child layout elements of a layout container. There may be pre-defined layout objects for common arrangements of layout elements, e.g., HorizontalLayout, VerticalLayout, BasicLayout, etc. Developers may define custom layout objects.

As used herein, the terms "constraint" and "layout constraint" refer to specified settings for a particular layout element. Exemplary constraints include, but are not limited to, values specified for width, height, left, right, top, bottom, baseline, % width, % height, etc. operations performed by or on layout objects may take constraints into account in determining layout and may, if necessary, relax constraints in pre-defined order.

As used herein, the term "measurement" refers to a determining of an attribute of an element using the element's constraints and/or contents. For example, measuring the width and height may be determined by looking at the contents of the element during a measurement pass.

As used herein, the term "layout pass" refers to a process used to lay out elements of electronic content at the time the content is being run or otherwise used. A layout pass generally involves assigning a width, height, and/or position for each element of the electronic content. A layout pass may involve iterating through a structure of elements and adjusting sizes and/or positions of interrelated elements. A layout pass may involve performing measurements to determine size and/or positions of elements. For example, in the case of a text label element used within a parent element, a layout pass may involve determining the parent size and the child size in a series of operations that account for the relationship between the label and the parent element. A layout pass in this example may measure how much space is needed for the text and then determine a size (e.g., width and height) of the parent element based on this information. During runtime of electronic content, a layout pass may occur initially and then again when a change or some other event occurs within the content that requires determining whether layout changes are required or not.

Figure 2:
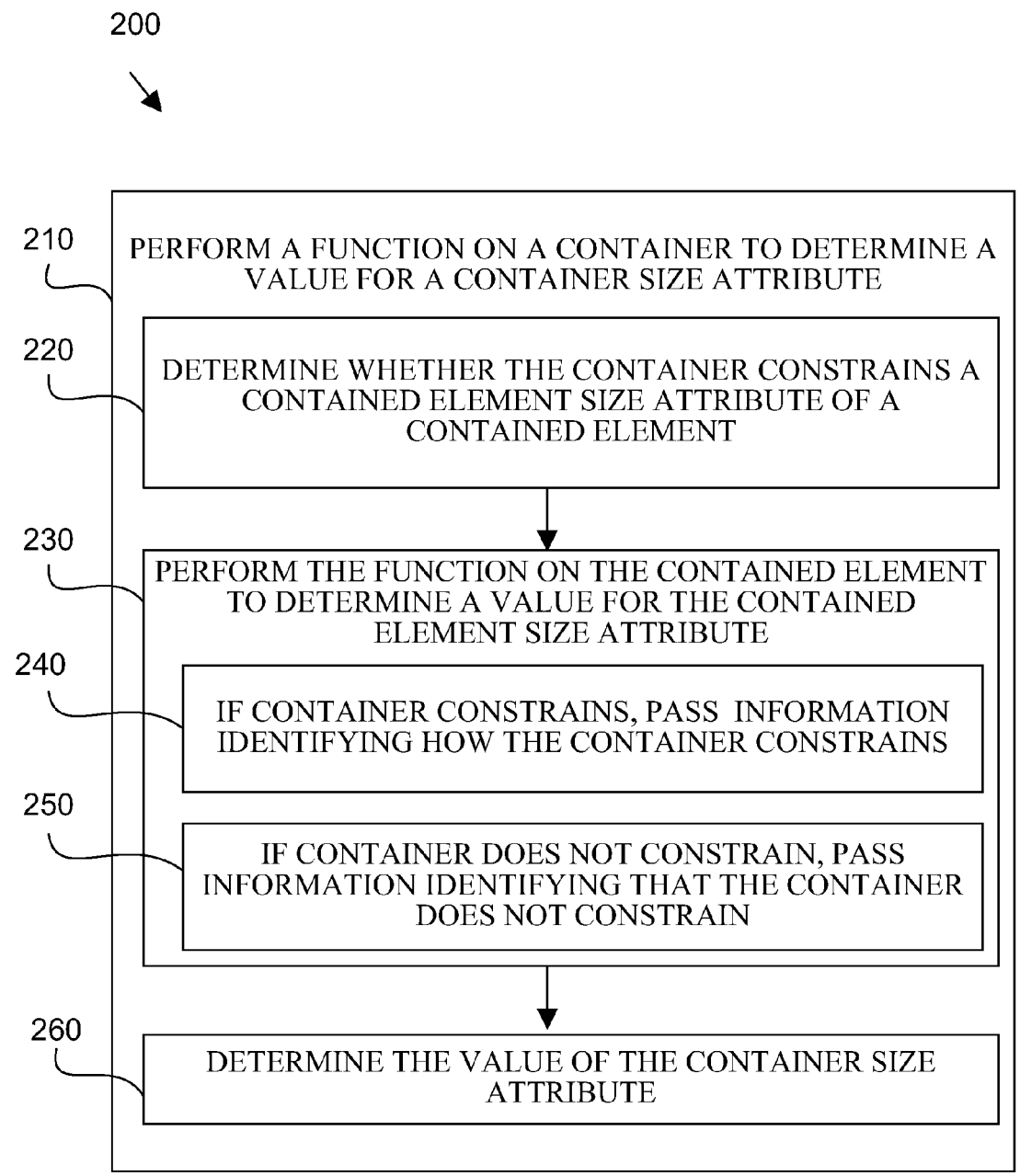
FIG. 2 is a flow chart illustrating an exemplary method of laying out elements of electronic content.

FIG. 2 is a flow chart illustrating an exemplary method 200 of laying out elements of electronic content. Such an exemplary method 200 may be performed on a variety of computer devices including, but not limited to device 10 of FIG. 1. For purposes of illustration not limitation, the features of exemplary method 200 are described with reference to elements of FIG. 1.

The exemplary method 200 involves performing a function on a container to determine a value for a container size attribute (e.g., for a height or a width of the container), as shown in block 210. Performing such a function may be performed by a processor such as processor 11 of a device 10 of FIG. 1. Performing the function on a container may be performed as part of a single pass through a data structure to lay out each element of the electronic content. Performing the function on a container may be performed to validate the layout of one or more elements of the electronic content, for example, in response to one or more elements being invalidated during use of the electronic content.

Performing the function on the container involves determining whether the container constrains a contained element size attribute (e.g., for a height or a width) of the contained element, as shown in block 220. Determining whether the container constrains the contained element size attribute may involve, as examples, determining if a fixed, minimum, or maximum value is specified for the container size attribute.

Performing the function on the container further involves performing the function on the contained element to determine a value for the contained element size attribute, as shown in block 230. As shown in block 240, if the container constrains the contained element size attribute, the function is passed information identifying how the container constrains the contained element size attribute. For example, information identifying how the container constrains the contained element size attribute may identify a specified value as a fixed, minimum, or maximum value constraint. The information identifying that the container constrains the contained element size attribute may comprise non-numerical information, for example, identifying a constraint type as being a fixed value, maximum value, minimum value, and the like.

However, as shown in block 250, if the container does not constrain the contained element size attribute, the function is passed information identifying that the container does not constrain the contained element size attribute. The information identifying that the container does not constrain the contained element size attribute may comprise non-numerical information.

Performing the function on the container further involves determining the value of the container size attribute, as shown in block 260. In one embodiment, a result of the function performed on the contained element is used in determining the value of the size attribute of the container. Such a result may, for example, comprise the value determined for the contained element size attribute and the value determined for the container size attribute may depend upon and thus be determined using the value determined for the contained element size attribute.

Methods such as method 200 of FIG. 2 can be used to address reflow issues and to provide robust and efficient layout functionality in electronic content. In one embodiment, layout functions conventionally separated into a measure phase and an update phase are combined into a single layout pass. A single layout pass can traverse a tree of elements from the top down passing information from a layout determination made for one element for use in a layout determination made for another element.

Figure 3:
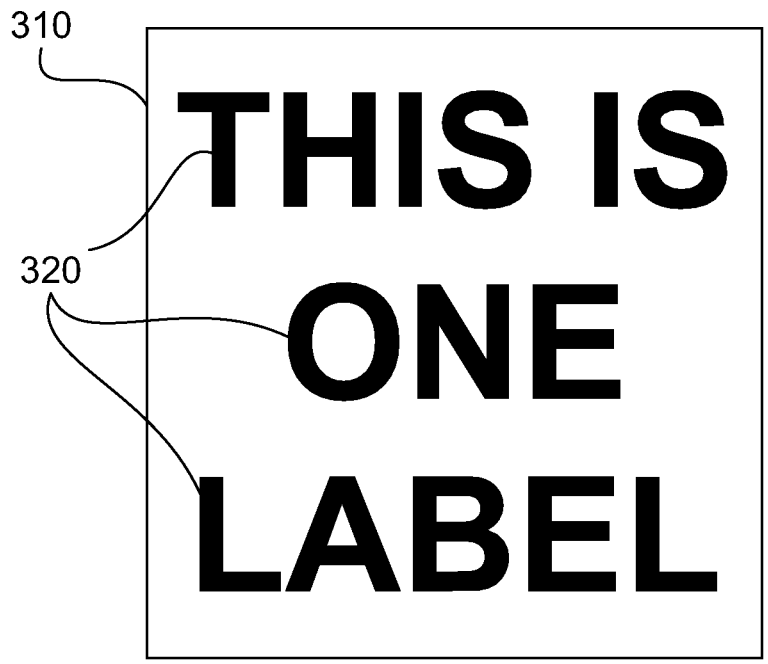
FIG. 3 illustrates elements displayed using an exemplary layout method.

FIG. 3 illustrates elements displayed using an exemplary layout method. Label 320 is contained within container 310. The label 320 is constrained to have a width that is 100% of the width of its container 310, but does not have any constraints for its height. The container 310 has a maximum width of 200 pixels and does not have a specified height constraint. A layout pass may involve determining a width and height for the container 310. A function may be called to determine the container's width and may identify that the container's width is constrained to a maximum value of 200 pixels. The function may be recursively called to determine any child element widths, in this example, determining that the width of the label 320 is 200 pixels based on the information that 200 pixels are available and a determination that the text of the label 320 will fill at least 200 pixels. A function called to determine a width of the label 320 may return a value to the calling function so that the container 310 can set its width accordingly. In this example, the width of the container 310 is determined to be 200 pixels based on a retuned value identifying that the width of the label 320 contained within is 200 pixels.

The same or another function may be called to determine the height of the container 310 and may identify that the height of the container 310 is not explicitly specified. The function may be recursively called to determine child element heights and may be passed information identifying that the container height does not constrain the label height and/or information providing information from prior determinations such as the determined label width. Based on the determined label width of 200 pixels and the information that the label's height is unconstrained by the container 310, the label's height can be determined. In this example, the label's height is determined to be 300 pixels based on a determination that, at 200 pixel width, the text of the label 320 will reflow onto three lines of 100 pixel height each for a total label height of 300. The label height determination can return a value that is used to determine the height of the container 310. In this example, the function called to determine the height of the label is called within and returns information to the function called to determine the height of the container. The returned information identifies in this example that the height of the label is 300 pixels. Since the height of the container 310 is unconstrained, it is determined based on its children, in this example, resulting in a container height of 300 pixels.

Embodiments disclosed herein provide layout functions that use both fixed values and information elements as parameters. By passing fixed values where there are fixed values available, passing constraints or other information where there are constraints or other layout information, and passing information identifying that there are no constraints when there are no constraints, the functions are able to accomplish layout functions more efficiently, while addressing potential interdependencies between elements.

Figure 4:
FIG. 4 illustrates another example of elements displayed using an exemplary layout method.

FIG. 4 illustrates another example of elements displayed using an exemplary layout method. Outer container 410 contains an inner container 420, which itself contains a label 430. Container 410 has a fixed width of 200 pixels. Container 420 has a 10 pixels offset. The label 430 has a width that is 100% of the width of container 420 and has text such that, if laid out at a 180 pixel width, then the label height is going to be 80 pixels. A layout pass calls a function on container 410 which determines that it is the top container of the layout and is 200 pixels in width. The function called on container 410 then calls a function (perhaps the same function called recursively) to lay out container 420 using the information that container 420 is constrained by a 10 pixel offset. This determines that container 420 has a 180 pixel width. The function called on container 420 then calls a function (again perhaps the same function called recursively) to lay out its only child—label 430. This determines that label 430 also has a width of 180 pixels. The function determines that the label must reflow the text at 180 pixels wide and determines that a height of 80 pixels is required for the label. When the function called on the label returns to container 420, it provides information that the label will have a 80 pixel height. The function called on container 420 determines that its only child, label 430, has been laid out at a height of 80 pixels and since container 420 does not have a constraint for its own height, the function causes container 420 to assume the height of the child label 430. Similarly, when the function called on the container 420 returns to container 410, it provides information that container 420 will have a 80 pixel height. The function called on container 410 uses this returned information and the 10 pixel offset required for container 420 to determine its own height at 100 pixels.

Figure 5:
FIG. 5 illustrates another example of elements displayed using an exemplary layout method involving measurement.

FIG. 5 illustrates an example of elements displayed using an exemplary layout method involving measurement. In FIG. 5, container 510 contains two child elements: button 520 and label 530. The layout of container 510 is specified as a content justified vertical layout meaning that the maximum width of all the elements in the layout is determined and the individual width of each element is constrained to that maximum width value, i.e., the layout stretches all the elements to the equal the widest one. In this example, there are no other constrains on the button 520 and label 530. Layout functionality may involve calling one or more functions to layout container 510 which recursively calls the layout function(s) to layout child elements, i.e., button 520 and label 530. The function called on container 510 may identify that container 510 has a content justified vertical layout perform one or more measurement functions to measure the widths of the button 520 and label 530. A measure width function on the button 520 returns a value that is determined based on the width of the text within the button 520 and a measure width function on the label 530 returns a value that is determined based on the width of the label 530. In this case the button width is measured at 180 pixels and the label width is measured at 200 pixels. The function(s) used to layout container 520 select the maximum of the two, 200 pixels, and that maximum value is used as the width of each child, i.e., for button 520 and label 530. In some circumstances it may be determined necessary to also measure child element heights. In those circumstances, the function(s) used to layout container 520 next measure the height of the button 520 using a measure height function that is passed the determined "max child element width," which in this specific example is 200—the label's width, as a parameter and measures the height of the label also using a measure height function that is passed the determined width as a parameter. The widths and heights determined for the child elements can be used to determine width and height of container 510 and to position the button 520 and the label 530 within it.

Reflow of text within an element is addressed by layout functionality that provides a facility to immediately lay out a sub-tree given partial information, i.e., based on information identifying a fixed value if one exists, identifying a constraint if one exists, or identifying that no fixed value or other constraint exists. A layout pass can be conducted from the top down in which a container's layout is determined by a function that, if necessary, calls functions parameterized with information useable to determine child element layouts and that return information such that after a container's children have been laid out, the layout of the container can be finally determined. Fixed values and information about constraints are passed as parameters in such functions such that the layout of all elements of a piece of electronic content can be determined in a single pass and without requiring that any elements be measured prior to the layout pass.

The above examples illustrate functions that layout a container by laying out the container's child elements. Another example involves a container A that has some contents C and is defined as a scrolling container. The scroll bars are only displayed when needed because the content extends beyond the width or height of the container. When a scroll bar is not displayed, there is more room to display the contents. This scenario creates a relatively complicated interrelationship between width and height that can be addressed using the techniques presented herein. Assume that the value of the width of the container is specified to be 100 pixels and the value of the height of the container is specified to be 100 pixels. An exemplary method of determining the layout of the container may involve determining those fixed values and examining the contents to determine the content width and content height. Content width/content height is the size of the entire content but the layout size of the contents may be smaller. The actual content size is 200 pixels in width by 90 pixels in height. Container A determines that a horizontal scroll bar is necessary since the content is more than 100 pixels in width. The horizontal scroll bar may be, for example, 15 pixels tall. Placing the horizontal scroll bar at the bottom of container A thus reduces the height available for content within container A to 85 pixels. Container A next determines whether the vertical scroll bar is necessary since the contents 90 pixel height is greater than the available 85 pixels.

To facilitate width and height determinations with respect to elements having potentially complicated width and height interdependencies, functions may be employed recursively and such that sub-tree determinations can be made and remade upon changes to the parameters that are used in those functions.

Measurements may be performed only when necessary because insufficient information requires the measurements. For example, in the above example of FIG. 5, if the vertical layout of container 510 has a fixed width and is equal justified, meaning that all elements are made as wide as the container 510 itself, measurement of the child elements is not necessary. To avoid unnecessary measurements, layout functionality may determine whether the constraints in place are sufficient to determine the size of the children and/or container.

One embodiment provides measurement of electronic content elements that involves splitting the measurements to separately measure width and height. Separate functions can be used to measure width and height. Such functions can be passed information as parameters so that the measurements can be performed as part of a single layout pass rather than as a separate measurement phase. Examples of information passed as parameters to such functions include, but are not limited to, minimums for the width/height, maximums for the width/height, explicit width/height, predetermined layout width/height, etc. Passing this information as parameters allows the layout functionality to efficiently measure elements. As a specific example, if a container has many child elements and needs to find a maximum width, the layout functionality can measure all the widths, determine the maximum, and use that maximum as a parameter in functions used to determine the heights of those elements.

Figure 6:
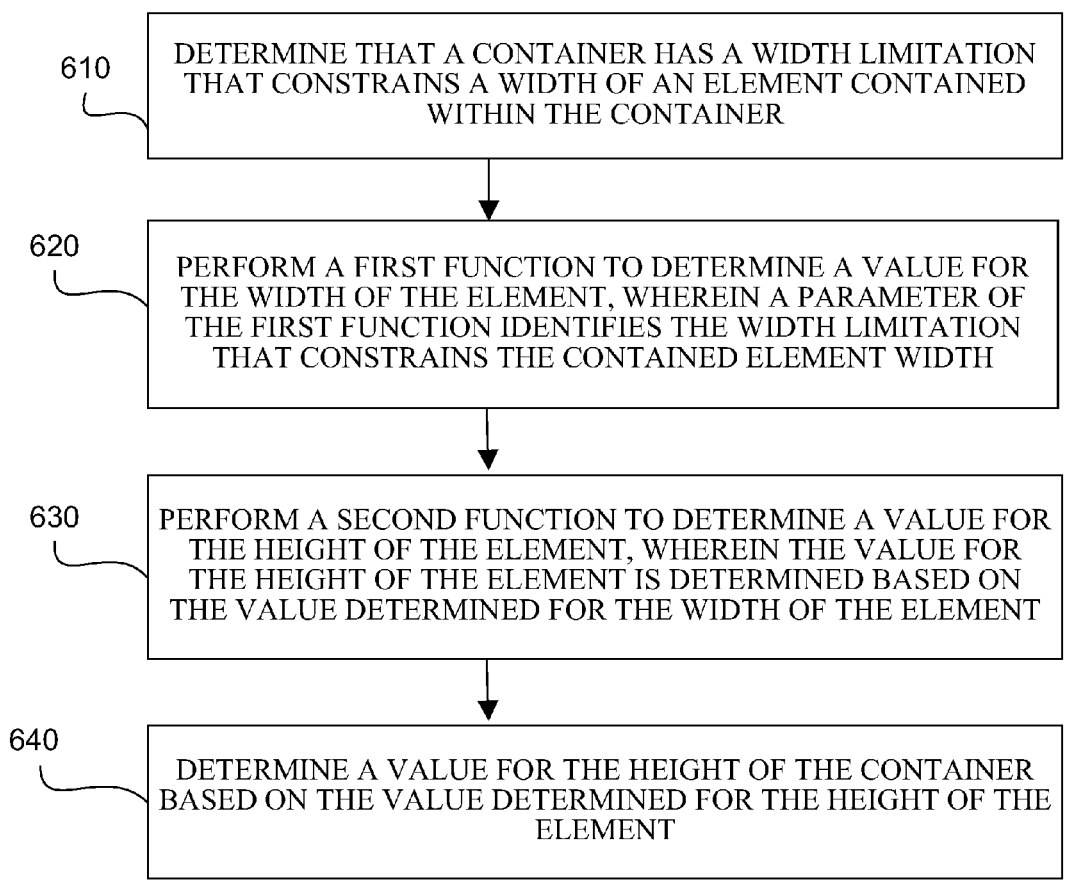
FIG. 6 is a flow chart illustrating an exemplary method of determining values for the width and height of a container and its contained elements.

FIG. 6 is a flow chart illustrating an exemplary method of determining values for the width and height of a container and its contained elements. Such an exemplary method 600 may be performed on a variety of computer devices including, but not limited to device 10 of FIG. 1. For purposes of illustration not limitation, the features of exemplary method 600 are described with reference to elements of FIG. 1.

The exemplary method 600 involves determining that a container has a width limitation that constrains a width of an element contained within the container, wherein the container is used in electronic content, as shown in block 610. Such determining may be performed by a processor such as processor 11 of a device 10 of FIG. 1. An exemplary width limitation specifies a fixed value, maximum value, or a fixed value for the width of the container.

The exemplary method 600 further involves performing a first function to determine a value for the width of the element, wherein a parameter of the first function identifies the width limitation that constrains the contained element width, as shown in block 620. Such performing may be performed by a processor such as processor 11 of a device 10 of FIG. 1. The exemplary method 600 further involves performing a second function to determine a value for the height of the element, wherein the value for the height of the element is determined based on the value determined for the width of the element, as shown in block 630. Such performing may be performed by a processor such as processor 11 of a device 10 of FIG. 1. The exemplary method 600 further involves determining, via the processor of the computer device, a value for the height of the container based on the value determined for the height of the element, as shown in block 640. Such performing may be performed by a processor such as processor 11 of a device 10 of FIG. 1.

Improved layout functionality is further provided by re-measuring only when required. Whether re-measurement is required can be determined by checking parent constraints and by applying various checks. Accordingly, certain embodiments provide improved techniques for invalidating elements used in electronic content, where invalidating an element provides an indication that re-measurement of the element may be required. These determinations may involve examining an element for potential invalidation by determining whether the parent's measured size depends on the child's measured size and/or whether the parent determines the size of the child so that the child is fully constrained in some way to the parent.

In one example, a container A contains a container B which contains a label. Container A has a fixed-sized, e.g., 100 pixels by 100 pixels. Container B is constrained to container A to have a 5 pixel left/right/top/bottom offset from the container A. The label contained within container B has a width that is 100% of container B and a height that is 100% of container B. If, during use of the electronic content, the text of the label changes, layout functionality determines whether to invalidate the label, container B, and/or container A. In the present example, when the text changes in the label, an invalidate function is called on the label to determine whether to invalidate the label. The layout functionality determines whether container B's measured size depends on the label's measured size. In this example, container B's measured size depends on the label's measured size and the invalidate function is called on container B. The invalidate function called on container B determines whether container A's measured size depends on the label's measured size. Here it does not because there is a fixed size for container A and the function goes on to determine whether container B is fully constrained by container A. Here container B is fully constrained by container A. Accordingly, the invalidate function called on container B ends and processing returns to the invalidate function called on the label to check if the label is fully constrained by container B. The label is fully constrained by container B since it is defined as having a height and width that are 100% of container B's height and width respectively. The invalidate size operation results in clearing any cached measured size for container B and the label, without re-laying out the container B. The label itself recomposes the text, but remains the same size. The re-measurement of container B and A is avoided.

Figure 7:
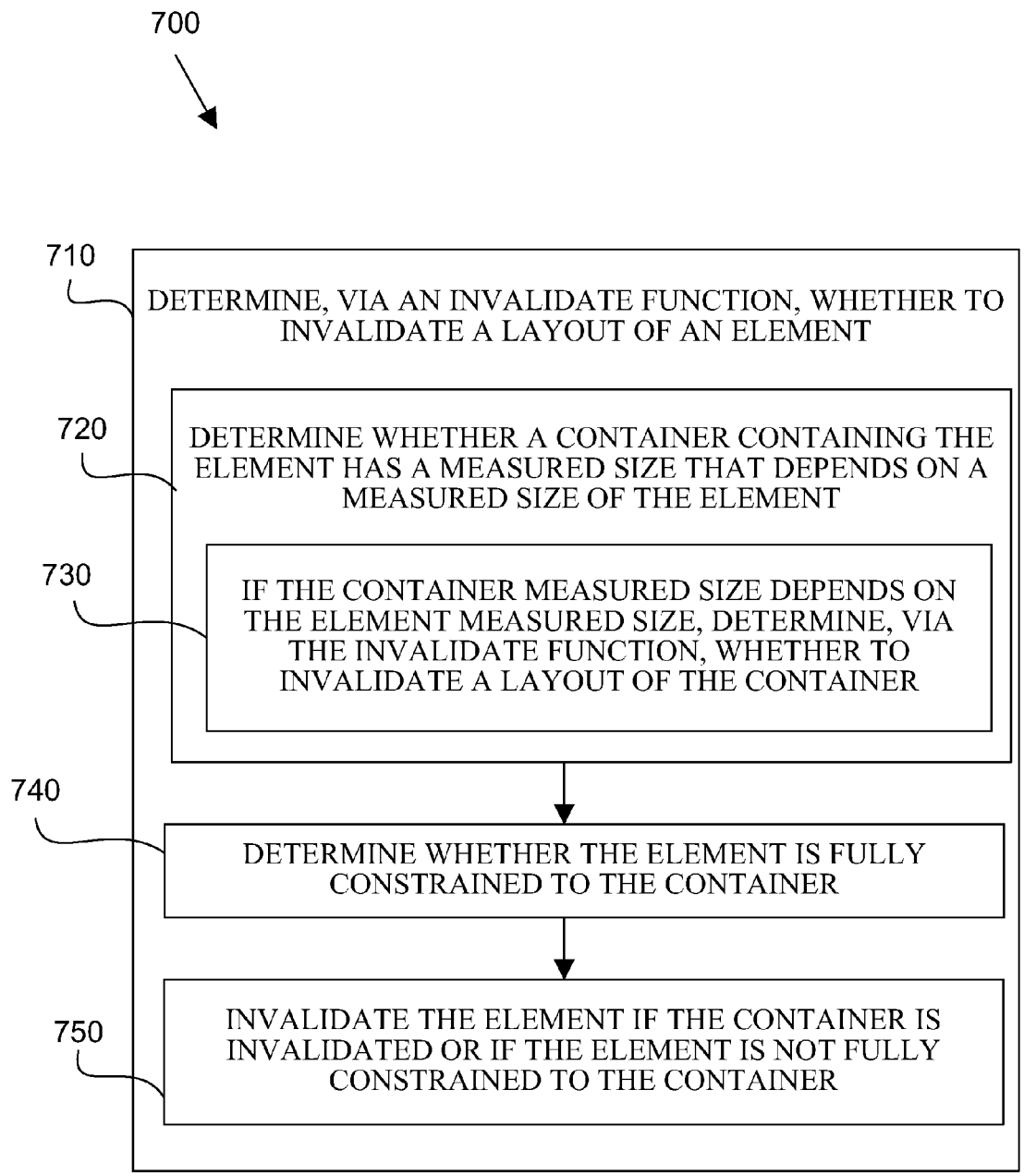
FIG. 7 is a flow chart illustrating an exemplary method of invalidating element layout.

FIG. 7 is a flow chart illustrating an exemplary method of invalidating element layout. Such an exemplary method 700 may be performed on a variety of computer devices including, but not limited to device 10 of FIG. 1. For purposes of illustration not limitation, the features of exemplary method 200 are described with reference to elements of FIG. 1.

The exemplary method 700 involves determining, via an invalidate function executed by a processor of a computer device, whether to invalidate a layout of an element, as shown in block 710. Invalidation of the layout indicates a requirement to lay out the element. Such determining may be performed by a processor such as processor 11 of a device 10 of FIG. 1.

Determining whether to invalidate the layout of the element involves determining whether a container containing the element has a measured size that depends on a measured size of the element, as shown in block 720. If the container measured size depends on the element measured size, the method determines, via the invalidate function, whether to invalidate a layout of the container, as shown in block 730.

Determining whether to invalidate the layout of the element further involves determining whether the element is fully constrained to the container, as shown in block 740.

Determining whether to invalidate the layout of the element further involves invalidating the element if the container is invalidated or if the element is not fully constrained to the container, as shown in block 750.

An exemplary single-pass reflow system may include one or more of a data structure to keep track of the invalid elements, a boolean flag associated with each layout element that designates whether it is currently valid or not, layout constraints associated with each layout element, the layout element tree structure, layout objects, layout object implement in a specific set of APIs, and/or a ConstrainedSize structure. ConstrainedSize is a data structure that represents constraints. For example it may have minWidth, maxWidth, width, minHeight, maxHeight, height, preserveAspectRatio, etc. constraints, each of which can be left unspecified. The structure is dynamically created by the layout object or layout elements when resizing or measuring child layout elements. The structure is initialized based on both the pre-defined layout logic of the current layout element or layout object and/or a combination of the layout constraints for that element and/or the child elements.

Exemplary measurement APIs and associated exemplary parameters used to implement layout elements include, but are not limited to, measureWidth(ConstrainedSize) and measureHeight(ConstrainedSize). Exemplary resize APIs and associated exemplary parameters used to implement layout elements include, but are not limited to, resize(ConstrainedSize):void, getLayoutWidth():Number, getLayoutHeight():Number, and getContentSize():Point. Exemplary positioning APIs and associated exemplary parameters used to implement layout elements include, but are not limited to, setLayoutPosition(x, y):void, and getLayoutPosition():Point. Exemplary validation APIs and associated exemplary parameters used to implement layout elements include, but are not limited to, validateLayout():void, invalidateLayout():void, measureDependsOnChildSize(element):Boolean, fullyConstraintsChild(element):Boolean, and invalidateSize():void.

When a layout object is associated with a layout element, the layout element may implement its APIs by delegation to the layout object for matching APIs, e.g., measureWidth, measureHeight, resize(), measureDependsOnChildSize(), and fullyConstraintsChild(). This allows developers to extend the layout system by either creating a custom layout object and associating it with the layout element or by creating a custom layout element.

One exemplary layout operation comprises the following operations. Initially, only the root of a layout element's tree is in an invalid queue and all of the layout elements are marked as "invalid." When the layout bounds need to be validated, usually before rendering, the layout system iterates the data structure that keeps track of the invalid elements. Each element is removed from the data structure. The element's validateLayout() method is called. The element's layout invalid flag is cleared to indicate that the elements is validated. When something in the electronic content changes that may require recalculation of the bounds, invalidation methods on the related layout elements are called. If the layout computations for the element need to be redone, then invalidateLayout() is called. This optimization details when no tracking in the data structure is required. If the change may affect the "measured" size of the element, then invalidateSize() is called. This method determines whether the measured size may affect the final computations and if so, calls invalidateLayout().

The exemplary API of measureWidth(ConstrainedSize): Number is an exemplary function used to calculate what the width of the element would be when taking into account the ConstrainedSize. For example, a label will be as wide as its text fits. If, however, the label exceeds the maxWidth (if specified) form ConstrainedSize, maxWidth will be returned.

The exemplary API of measureHeight(ConstrainedSize): Number is an exemplary function used to calculate what the height of the element would be when taking into account the ConstrainedSize. For example, a label will be as tall as its text fits. If, however, the ConstrainedSize has specified "width", then that "width" will be used to recompose the text and figure out the height of the text at the specified width.

The measureWidth() & measureHeight() can be implemented for layout containers and layout objects in terms of calling measureWidth()/measureHeight() on their child layout elements and combining the measurements according to the pre-defined layout logic. For example a VerticalLayout may sum all of the measured heights of the children in order to implement measureHeight(), while calculating maximums of the measured widths to implement measureWidth().

Measurements may pass constraint data top to bottom along a DOM tree or other data structure and returns measurement information bottom-top along the DOM tree or other data structure. Additionally, having the measurement split by width/height dimension may allow results from measuring one dimension to be included in the ConstrainedSize, perhaps undergoing a pre-defined calculation, and used as input while measuring the other dimension. This allows implicit sibling/layout constraints to be taken into account when measuring.

GENERAL

Numerous specific details are set forth herein to provide a thorough understanding of the claimed subject matter. However, those skilled in the art will understand that the claimed subject matter may be practiced without these specific details. In other instances, methods, apparatuses or systems that would be known by one of ordinary skill have not been described in detail so as not to obscure claimed subject matter.

Some portions are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is a self-consistent sequence of operations or similar processing leading to a desired result. In this context, operations or processing involves physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

That which is claimed:

1. A computer-implemented method comprising:
 performing, via a processor of a computer device, a function on a container to determine a value for a container size attribute, wherein the container is used in electronic content and a contained element is contained by the container, wherein performing the function on the container comprises:
  determining that the container constrains a contained element size attribute of the contained element based at least in part on identifying that a fixed value, a minimum constraint value, or a maximum constraint value is not associated with the container size attribute;

based on the determination that the container does not constrain the contained element size attribute, performing the function on the contained element to determine the value for the contained element size attribute by passing to the function, as a parameter, information identifying that there are no constraints of the container on the contained element size attribute; and determining the value of the size attribute of the container based on the determined value for the contained element size attribute.

2. The method of claim 1, wherein the container constrains the contained element size attribute if the fixed value is specified for the container size attribute.

3. The method of claim 1 wherein, wherein the container constrains the contained element size attribute if the minimum constraint value or maximum constraint value is specified for the container size attribute.

4. The method of claim 1 wherein a result of the function performed on the contained element is used in determining the value of the size attribute of the container in performing the function on the container.

5. The method of claim 4 wherein the result of the function performed on the contained element comprises the value determined for the contained element size attribute, wherein the value determined for the container size attribute depends upon the value determined for the contained element size attribute.

6. The method of claim 1 wherein:
the container size attribute is a width of the container; and
the contained element size attribute is a width of the contained element.

7. The method of claim 1 wherein:
the container size attribute is a height of the container; and
the contained element size attribute is a height of the contained element.

8. The method of claim 1 wherein performing the function on a container is performed as part of a single pass through a data structure to lay out each element of the electronic content.

9. The method of clam 1 wherein performing the function on a container is performed to validate the layout of one or more elements of the electronic content, wherein the function is performed in response to one or more elements being invalidated during use of the electronic content.

10. The method of claim 1, wherein the function comprises a first layout pass function and the method further comprises performing, via the processor of the computer device and in response to an event adjusting content included in the container, a second layout pass function on the container to determine a second value for the container size attribute.

11. A computer-implemented method comprising:
determining, via a processor of a computer device, that a container has a width limitation that constrains a width of an element contained within the container and that the container has no height limitation that constrains a height of the element contained within the container, wherein the container is used in electronic content;
performing, via the processor of the computer device, a first function to determine a value for the width of the element, wherein a parameter of the first function identifies the width limitation that constrains the contained element width;
in response to an event adjusting a portion of the electronic content, performing, via the processor of the computer device a second function to determine a value for the height of the element, wherein the value for the height of the element is determined based on the value determined for the width of the element and information identifying that the container has no height limitation that constrains the height of the element contained within the container; and
determining, via the processor of the computer device, a value for the height of the container based on the value determined for the height of the element.

12. The method of claim 11 wherein the width limitation specifies a fixed value for the width of the container.

13. The method of claim 11 wherein the width limitation specifies a maximum value for the width of the container.

14. The method of claim 11 wherein the width limitation specifies a minimum value for the width of the container.

15. A computer-implemented method comprising:
determining, via an invalidate function executed by a processor of a computer device, whether to invalidate a layout of an element, wherein invalidation of the layout indicates a requirement to lay out the element, wherein determining whether to invalidate the layout of the element comprises:
determining whether a container containing the element has a measured size that depends on a measured size of the element and, if the container measured size depends on an element measured size, determining whether to invalidate the layout of the container;
determining whether the element is fully constrained to the container; and
invalidating the element if the container is invalidated or if the element is not fully constrained to the container.

16. A system comprising:
a processor for executing instructions stored in computer-readable medium on one or more devices providing an application for specifying modifications to electronic content, the application comprising one or more modules configured to perform the steps comprising:
determining that a container has a width limitation that constrains a width of an element contained within the container and that the container has no height limitation that constrains a height of the element contained within the container, wherein the container is used in electronic content;
performing a first function to determine a value for the width of the element, wherein a parameter of the first function identifies the width limitation that constrains the contained element width;
in response to an event adjusting a portion of the electronic content, performing a second function to determine a value for the height of the element, wherein the value for the height of the element is determined based on the value determined for the width of the element and information identifying that the container has no height limitation that constrains the height of the element contained within the container; and
determining a value for the height of the container based on the value determined for the height of the element.

17. A non-transitory computer-readable medium on which is encoded program code, the program code comprising:
program code for performing, via a processor of a computer device, a function on a container to determine a value for a container size attribute, wherein the container is used in electronic content and a contained element is contained by the container, wherein the program code for performing the function on the container comprises:
program code for determining that the container constrains a contained element size attribute of the contained element based at least in part on identifying that a fixed value, a minimum constraint value, or a maximum constraint value is not associated with the container size attribute;

program code for performing the function on the contained element to determine the value for the contained element size attribute by passing to the function, as a parameter, information identifying that there are no constraints of the container on the contained element size attribute based on the determination that the container does not constrain the contained element size attribute; and program code for determining the value of the size attribute of the container based on the determined value for the contained element size attribute.

* * * * *